Figure 1:
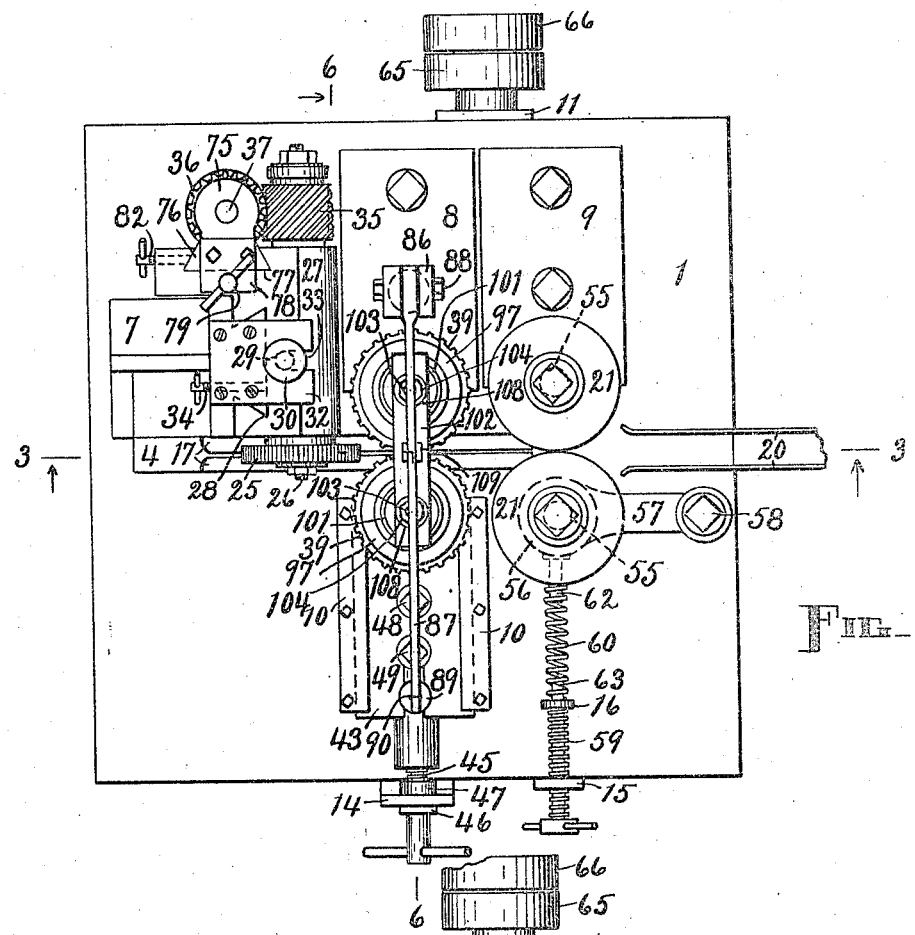

C. L. ERICSON.
SAW SETTING MACHINE.
APPLICATION FILED FEB. 3, 1917.

1,238,500.

Patented Aug. 28, 1917.
4 SHEETS—SHEET 1.

WITNESS
A. C. Fairbanks

INVENTOR.
Carl L. Ericson,
BY
Frank A. Cutter,
ATTORNEY.

C. L. ERICSON.
SAW SETTING MACHINE.
APPLICATION FILED FEB. 3, 1917.
1,238,500.
Patented Aug. 28, 1917.
4 SHEETS—SHEET 2.
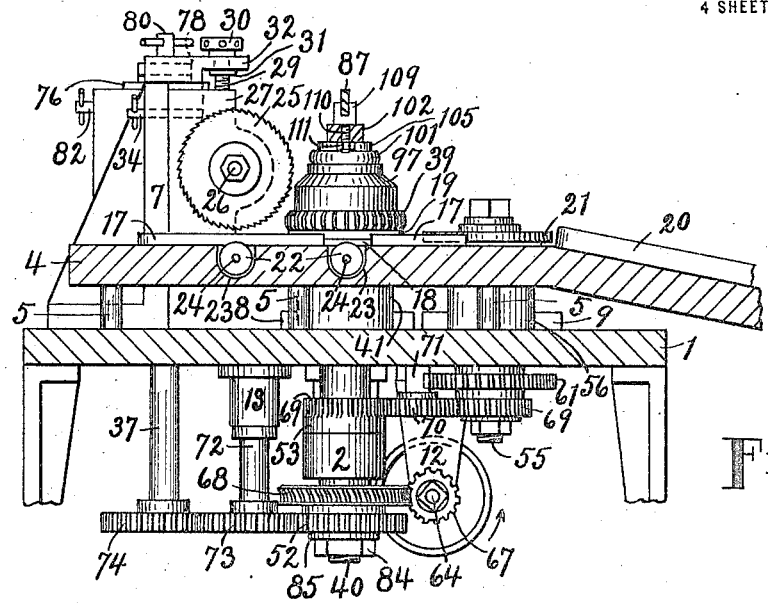
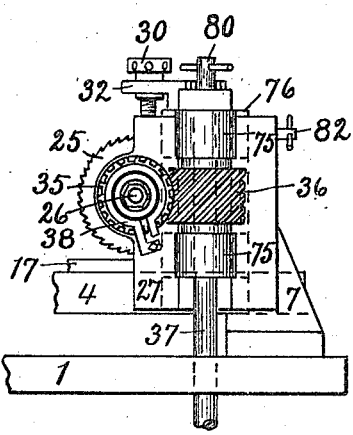
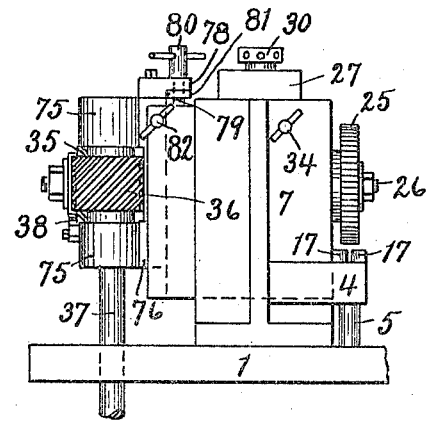
WITNESS
A. C. Fairbanks
INVENTOR.
Carl L. Ericson
BY
Frank A. Cutter,
ATTORNEY.

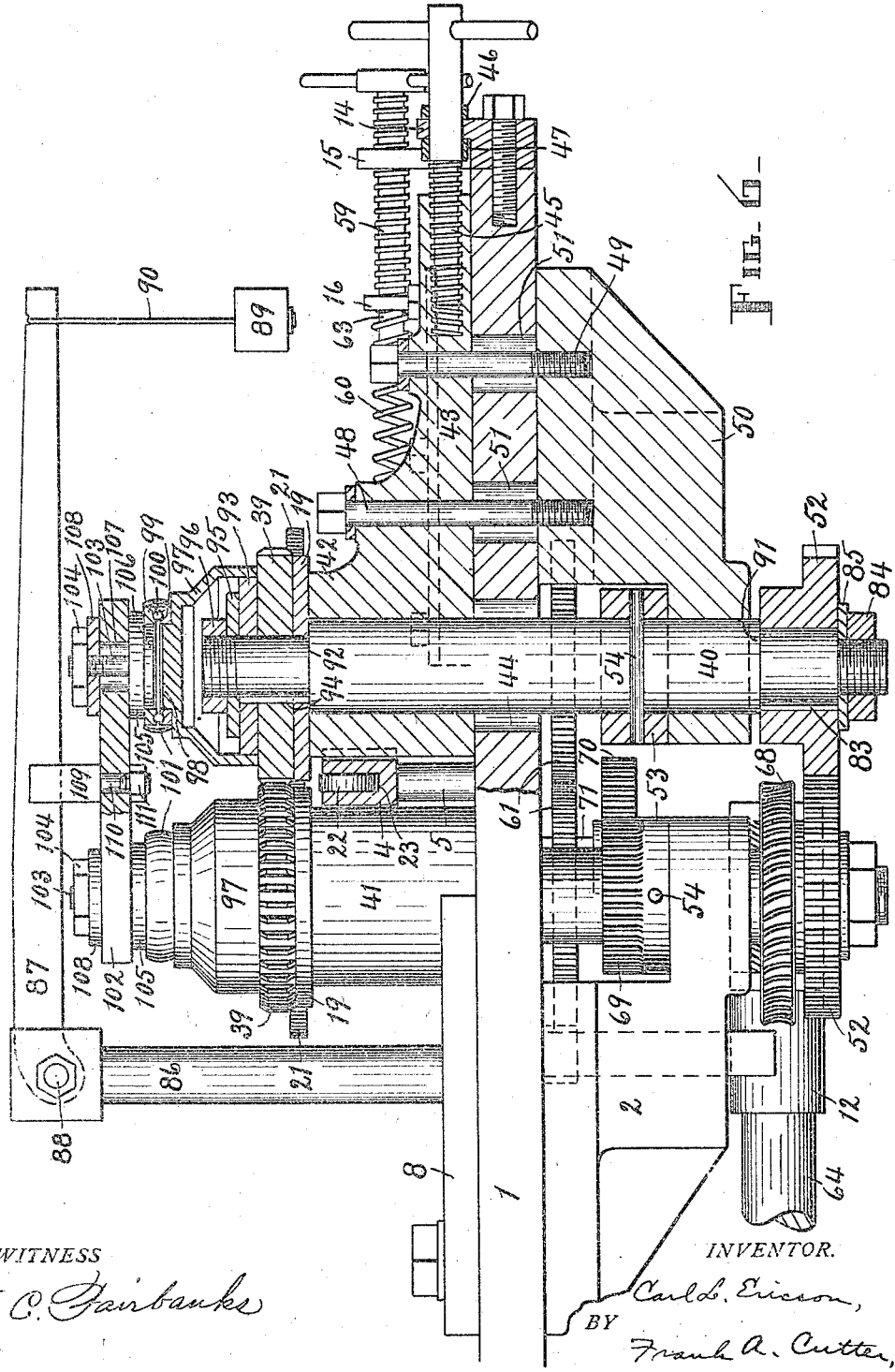

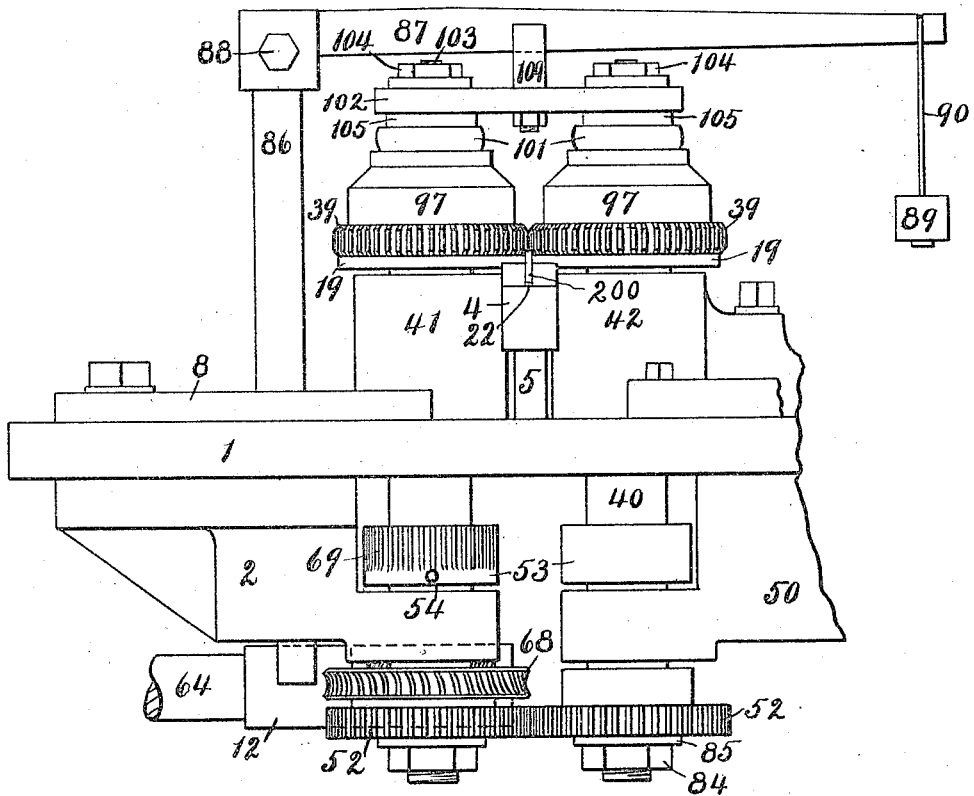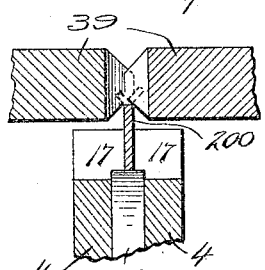

UNITED STATES PATENT OFFICE.

CARL L. ERICSON, OF LONGMEADOW, MASSACHUSETTS, ASSIGNOR TO AMERICAN SAW & MANUFACTURING COMPANY, OF SPRINGFIELD, MASSACHUSETTS, A CORPORATION OF MASSACHUSETTS.

SAW-SETTING MACHINE.

1,238,500.  Specification of Letters Patent.  Patented Aug. 28, 1917.

Application filed February 3, 1917. Serial No. 146,382.

*To all whom it may concern:*

Be it known that I, CARL L. ERICSON, a subject of the King of Sweden, residing at Longmeadow, in the county of Hampden and State of Massachusetts, have invented a new and useful Saw-Setting Machine, of which the following is a specification.

My invention relates to improvements in automatic machines for setting saws and more particularly hack-saws, and resides in a stationary or fixed abutment, bed, or support for the saws, and movable setter-rolls, that is to say, setter rolls which automatically rise and fall under action imparted thereto by any unevenness or variation in the width of said saws, the teeth of said setter-rolls thus being at all times in exact registry vertically with the teeth of the saws, and said invention resides further in certain peculiar means for minutely adjusting the feed-roll, that is, the roll which feeds the saws to the setter-rolls, so that the teeth of said feed-roll shall be in exact accord or in time with the teeth of the setter-rolls, together with the mechanism and such auxiliary and subsidiary parts and members as may be necessary or desirable to complete and render practicable and efficient my machine, all as hereinafter set forth.

In setting machines for hack-saws, heretofore, it has been customary to employ setter-rolls which always revolved in unchanging horizontal planes, and to provide movable or yielding abutments or supports, for the saws, which supports were capable of accommodating themselves with a varying degree of efficiency to inequalities in the width of the saws, it being a well-known fact that hack-saws do vary more or less in width. One of the serious objections to which this old construction is open is clearly apparent upon remembering that the saws must be fed to the setter-rolls by a feed-roll which is necessarily more or less remote from said setter-rolls, in consequence of which a saw may be depressed too much or too little by said feed-roll to enable the setter-rolls properly to perform their office, with the result that the saw teeth are not properly set. In my machine the horizontal plane of the abutment or support for the saws and the horizontal plane of the axis of the feed-roll are always the same, that is, they are unchanging, while the horizontal plane of the setter-rolls may vary and in fact does vary and change from higher to lower, and vice versa, as saws having varying widths pass under, with their teeth between, said setter rolls. The primary object of my invention, therefore, is to provide a saw-setting machine with mechanism which enables the setter-rolls automatically to rise and fall under the action of a saw which varies in width, to the end that the setting operation is materially enhanced and the saw teeth are set with great accuracy and uniformity. In this machine the setter-roll teeth follow most closely and with absolute accuracy the teeth of the saw.

Another object is to afford means, in a machine of this character, of adjusting the feed-roll relative to the setter-rolls so that the saws will be presented and fed to said setter-rolls, by said feed-roll, in such a manner as to obviate any failure on the part of the setter-roll teeth to engage with great exactitude the saw teeth. Any failure on the part of the feed-roll to present and feed properly and accurately the saws to the setter-rolls would necessarily result in defective setting of the saw teeth, and might damage the setter-rolls and seriously affect or injure other parts of the machine.

Other objects and advantages will appear in the course of the following description.

A preferred embodiment of my invention, whereby I attain the objects and secure the advantages of the same, is illustrated in the accompanying drawings, and I will proceed to describe said invention with reference to said drawings, although it is to be understood that the form, construction, arrangement, etc., of the parts in various aspects are not material and may be modified within the scope of the appended claims without departure from the spirit of the invention.

Figure 2:
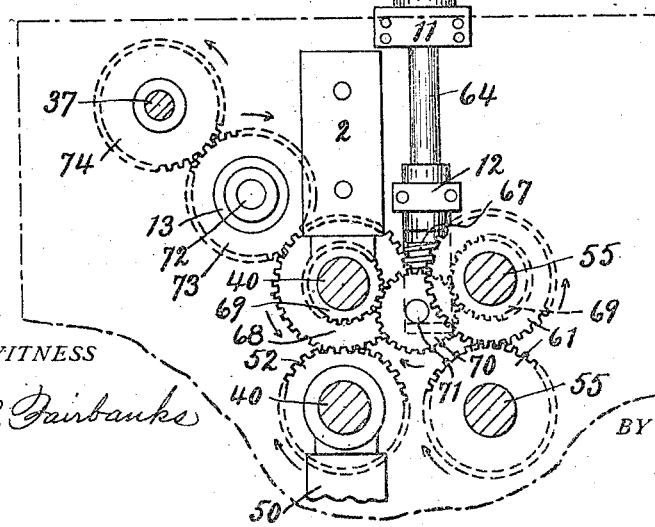

In the drawings, in which like numerals designate like parts throughout the several views, Figure 1 is a top plan of a saw-setting machine which embodies a practical and preferred form of my invention as aforesaid; Fig. 2, a plan of the gearing, the table which is above said gearing being indicated by dot-and-dash lines; Fig. 3, a vertical section through said machine taken on lines 3—3, looking in the direction of the associated arrow, in Fig. 1; Fig. 4, an end elevation of the feed-roll-adjusting mechanism; Fig. 5, a front elevation of said mechanism; Fig. 6, an enlarged vertical section through the machine, on lines 6—6, looking in the direction of the associated arrow, Fig. 1; Fig. 7, a diagrammatic view showing the setter-rolls raised by a saw, and, Fig. 8, an enlarged sectional detail showing the relation of said setter-rolls to said saw.

The supporting frame and its accessories, the feeding, setting, and conveying mechanisms for the saws, and the driving and adjusting mechanisms for said first-named mechanisms, broadly considered and separate and apart from the new features and elements, are old and familiar to those skilled in the art, except where new combinations are found to exist between old and new elements. The old parts and members I will first describe briefly, pointing out wherever seems desirable such parts and members as enter more closely into combination with or perhaps form elements of the new features.

For the purposes of this description, it will be assumed that the left-hand end of the machine, as it is disposed in the first view, is the front end, it being at this end that the saws are fed into the machine, and that the right-hand side of said machine, which is at the bottom of said view, is the front side, the other end and side being designated by the term rear.

So much of the frame as is shown herewith comprises a suitably supported table or bed 1, to the underside of which are secured two brackets 2 and 50, such brackets being about midway between the front and back end edges of said bed, and arranged with their supporting ends adjacent to each other, as clearly shown in Fig. 6; an abutment or guide 4 for the saws, said guide being fixedly mounted on posts 5 which rise from said bed, and taking the place of the movable abutment or guide to which reference has hereinbefore been made; a bracket 7 mounted on and secured to said bed adjacent to the front end thereof and contiguous to the back side of said guide; plates 8 and 9 bolted to the top of said bed behind the back side of said bracket 7 and between said guide and the back side edge of said bed; ways 10—10 bolted to the top of said bed between the front side of said guide and the front side edge of said bed, and in line with said plate 8; horizontal bearings 11 and 12 and a vertical stud-holder socket 13 secured to the underside of said bed in positions presently to be described, and lugs 14 and 15 rising from and above the front side edge of said bed.

The guide 4 is provided as usual with side pieces 17, which side pieces are cut out, as represented at 18 in Fig. 3, to permit gripping rolls 19—19 to grasp the saw being set, and with side pieces 20. The side pieces 20 are on the rear end portion of the guide 4, which portion may be inclined downwardly and rearwardly from the forward portion, the latter being horizontal. The side pieces 17 direct the saw to the gripping rolls 19 and from said rolls to conveyer rolls 21—21. Upon passing the conveyer rolls 21 the saw is directed by the side pieces 20.

For the purpose of decreasing the friction between the guide 4 and the saw, two rolls 22 may be provided to rotate in slots 23—23 in said bed, on spindles 24—24 that are journaled in said guide in position to cause the peripheries of said rolls to project slightly above the upper surface of said guide. One of the rolls 22 is located directly under a feed-roll 25 and the other of said rolls is located directly under the bite between the gripping rolls 19. The saw is introduced between the front ends of the side pieces 17, with its teeth uppermost, so that the back edge of said saw rides on the rolls 22.

The feed-roll 25, which is provided with teeth of such shape, size, and proportion or arrangement that they are adapted to engage with the teeth of the saw, is secured on the front end of a horizontal shaft 26 which is journaled in a vertically sliding carrier 27. The carrier 27 is dovetailed at 28 to the back side of the bracket 7, and elevated and depressed by a vertical screw 29 tapped into said carrier and held against longitudinal movement by means of a head 30, collar 31, and plate 32. The plate 32 is secured to the top of the bracket 7 and projects beyond the back side of said bracket, while the head 30 and the collar 31 are integral parts of the screw 29, respectively located above and below said plate, the latter being slotted at 33 to permit the parts to be assembled. A set-screw 34 is tapped into the front side of the bracket 7 and arranged to engage the inner, front side of the dovetailed part of the carrier 27, for the purpose of locking said carrier in place after being adjusted by the screw 29.

Upon loosening the set-screw 34 and turning the screw 29 to raise or lower the carrier 27, the feed-roll 25 will be adjusted accordingly, and so caused to fit any saw and its teeth that the machine is designed to handle.

The feed-roll 25 is positioned directly over the longitudinal center of the guide 4. A spiral gear 35 is secured on the shaft 26, at the terminal opposite to that to which the feed-roll 25 is secured, and said spiral gear intermeshes with a spiral gear 36 secured on a vertical shaft 37. These members, although old in themselves, enter into one of the improved features of the machine, and will be referred to more in detail hereinafter.

The shaft 26 is provided at its rear terminal with an ordinary band brake 38 to prevent back-lash.

Associated with the gripping rolls 19 are two setter-rolls 39, the latter being above the former and carried in position on opposite sides of the longitudinal, vertical, central plane of the guide 4 to set the teeth of a saw which is in the grasp of said first-mentioned rolls. The setter-rolls 39 are of usual construction and act on the teeth of the saw in the usual manner. The gripping roll 19 and the setter-roll 39, which are back of the guide 4, are mounted on a vertical shaft 40 journaled in a bearing 41, at the inner end of the plate 8, and in the bracket 2, said shaft extending above said bearing and below said bracket, and necessarily passing through the bed 1. The other gripping roll 19 and setter-roll 39 are mounted on a second vertical shaft 40 journaled in a bearing 42 and the bracket 50, said bearing being at the inner end of a slide 43 which operates on top of the bed 1 in the ways 10. Said second shaft 40 passes through a slot 44 in the bed 1, (see Fig. 6), and is adjustable toward and away from the first shaft 40. Such adjustment is effected through the medium of a screw 45, which extends through the lug 14, being held against longitudinal movement in said lug by collars 46 and 47, into screw-threaded engagement with the slide 43. The collars 46 and 47 are on the screw 45 with the lug 14 between. The bracket 50 is held against the underside of the bed 1 by means of bolts 48 and 49, which bolts pass down through the slide 43 and through slots 51—51 in the bed 1 into screw-threaded engagement with said bracket. When the bolts 48 and 49 are loosened it is possible to move the slide 43 in or out, by means of the screw 45, the bracket 50 and the shaft 40 journaled therein and in the slide bearing 42 moving also. After adjustment the bolts 48 and 49 are again tightened to lock the parts in position. The slots 44 and 51 permit the shaft 40, that passes through said slot 44, and the bolts 48 and 49 to move and therefore the aforesaid adjustment to be made. Said adjustment is for the purpose of adapting the gripping rolls 19 and the setter-rolls 39 to saws of different thicknesses, hence is very slight, not enough, in fact, to cause intermeshing gears 52 on the shafts 40 to become disengaged. Two collars 53, which are secured by a corresponding number of pins 54 to the shafts 40, and normally rest and revolve on the inner, supporting terminals of the brackets 2 and 50, are the more essential elements provided to prevent said shafts from dropping in their bearings below a predetermined level.

The conveyer rolls 21, which take the saw, after it passes the gripping rolls 19 and the setter-rolls 39, and actuate said saw rearwardly on the guide 4 toward the back end of said guide, are slightly larger in diameter than are said gripping rolls. The reason for this is that the portion of the saw which is in the grasp of the conveyer rolls 21, while another portion of said saw is in the grasp of the gripping rolls 19, will have imparted thereto a superior urge or pull, whereby the saw is prevented from buckling, any tendency toward a backward movement is obviated, and the action of the setter-rolls is enhanced. The conveyer rolls 21 are mounted on two vertical shafts 55, one of which shafts is journaled in a bearing 56 at the inner end of the plate 9, and the other in a bearing at the front end of an arm 57, the rear end of said arm being pivoted at 58 to the bed 1. Both shafts 55 extend through the bed 1. The front conveyer roll 21 is held yieldingly against a saw therebetween, by means of a screw 59 tapped into the lug 15 and provided with an annular flange 16, and a spring 60 introduced between said flange and the forward terminal portion of the arm 57. The forward terminal portion or bearing of the arm 57 and the inner terminal of the screw 59 are respectively provided with center studs 62 and 63 for the spring 60. The screw 59 is used to regulate the tension of the spring 60. The oscillatory movement of the front conveyer roll 21 is comparatively slight and insufficient to disengage two intermeshing gears 61 secured to the shafts 55 at their lower ends.

Of the old features of the machine there remains only the driving mechanism to explain.

The bearings 11 and 12 are behind the vertical plane of the back side of the bracket 2, or practically so, and a driving shaft 64 is journaled in said bearings in parallel relation with said bracket. The shaft 64 is provided at the outer terminal with the customary tight and loose pulleys 65 and 66, respectively, and has secured thereto at the inner terminal a worm 67. The worm 67 intermeshes with a worm-gear 68 secured on the shaft 40 which is non-adjustable. Besides the gears already mentioned as being mounted on the shafts 40 and 55 which are non-adjustable, there are two other gears 69 secured to said shafts, and these latter gears intermesh with an intermediate gear 70. The gear 70 is loosely mounted on a stud 71 that depends from the bed 1. The socket 13 is forward of the front side of the bracket 2, and said socket supports a stud 72. An intermediate gear 73 is loosely mounted on the stud 72, and intermeshes with the gear 52 on the non-adjustable shaft 40. A gear 74 is secured on the shaft 37 at the lower end thereof, and intermeshes with the gear 73.

It is now clearly to be seen that the shaft 64, with its worm 67, when in operation, drives the gripping-roll and setter-roll shafts 40, through the medium of the worm-gear 68 and the gears 52; drives the conveyer-roll shafts 55, through the medium of said worm-gear and its shaft 40, the gear 69 on said last-mentioned shaft, the intermediate gear 70, the gear 69 on the non-adjustable shaft 55, and the gears 61 on said shafts 55; and drives the feed-roll shaft 26, through the medium of said worm-gear and its shaft, said gear 52 on said last-named shaft, the intermediate gear 73, the gear 74, the shaft 37, and the spiral gears 36 and 35. The driving and driven parts and members operate, of course, in the required directions and are properly timed.

Passing now to the new features, I will first explain the means whereby the adjustment of the feed-roll 25 to the setter-rolls 39 is effected, and then describe in detail the automatically yielding setter-roll mechanism.

The shaft 37 is journaled in a pair of bearings 75 on the back or outer side of a vertical carrier 76 which is dovetailed at 77 into the corresponding end of the carrier 27, and may be raised and lowered in said carrier 27. The carrier 76 is provided at the top with an outwardly extending lip or plate 78 that overhangs the carrier 27. A screw 79 is tapped into the carrier 27, after passing through the plate 78, said screw having a head 80 above and a flange or collar 81 below said plate, to prevent said screw from moving longitudinally in said plate. A horizontal set-screw 82 is tapped into the carrier 27 from the front and arranged to bear at its inner end against the carrier 76 to lock the same in place after adjustment.

The adjustment of the feed-roll 25, so that the engagement of the teeth thereof with the teeth of the saw shall be in exact accord with the engagement of the teeth of the setter-rolls 39 with the teeth of said saw, and the same shall be properly and accurately presented and fed to the gripping rolls 19 and said setter-rolls, is effected in the following manner: The set-screw 82 is loosened, and the screw 79 is partially rotated in one direction or the other, accordingly as it is required to elevate or depress the carrier 76, when said set-screw is retightened. The shaft 37 and the spiral gear 36 are moved up or down, since said shaft is journaled in the bearings 75 which are integral with the carrier 76, and said gear partially rotates the spiral gear 35 and with the latter the shaft 26 and the feed-roll 25. Very little adjustment of the feed-roll 25 is required in order to bring the same into agreement with the setter-rolls 39, and the carrier 76 need never be moved by the screw 79 far enough to bring about the disengagement of the spiral gear 36 from the spiral gear 35, or of the gear 74 from the gear 73, or materially interfere with the transmission at these places. This adjusting means, therefore, does not affect the operation of the feed-roll driving mechanism, and I am able to employ parts of such mechanism in the construction of such means.

The spiral gear 36, being securely attached to the shaft 37 between the bearings 75, holds said shaft against endwise movement and consequently prevents downward displacement.

It may be noted in passing and before describing the new setter-roll mechanism that, in the present case, the gears may be keyed to their respective shafts, as represented at 83, in Fig. 6, where one of the gears 52 is shown keyed to the adjustable shaft 40, and that nuts 84 and washers 85 may be employed on the shafts 40 and 55 under the gears thereon to prevent the latter from dropping; furthermore, that the worm-gear 68 is above the gear 52 on the non-adjustable shaft 40, and the gear 69 above the collar 53 on said shaft, and that the gear 69 is below the gear 61 on the non-adjustable shaft 55.

For a full understanding of the aforesaid setter-roll mechanism reference is to be had to Figs. 1, 3 and 6.

A post 86 rises from the plate 8, and a lever 87, having one end pivoted at 88 to the top of said post, and a weight 89 suspended by a cord 90 from the other end, extends over both shafts 40.

Each shaft 40 has a shoulder 91 above the worm-gear 68, in the one case, and above the hub of one of the gears 52 in the other case, and also has a shoulder 92 which normally is level with the top of either the bearing 41 or the bearing 42, according to whichever of the two shafts is considered—see Fig. 6. When either shaft 40 is down so that its shoulder 92 is level with the top of the bearing (41 or 42), the shoulder 91 on said shaft is below the level of the bottom of the bracket 2 or 50 as the case may be. The shafts 40 have, therefore, an independent vertical movement that is equal to the distance between the bottom surfaces of the brackets 2 and 50, adjacent to said shafts, and the shoulders 91, or the hubs of the worm-gear 68 and one of the gears 52, which worm-gear and the gears 52 are held between said shoulders and the nuts 84 and washers 85 on said shafts. The brackets 2 and 50 and the collars 53 with their pins 54 limit the downward movement of the shafts 40, and the worm-gear 68, gears 52, washers 85, and nuts 84 limit the upward movement of said shafts. One of the gripping rolls 19 is mounted on each shaft 40 directly above the shoulders 92 on such shaft, one of the setter-rolls 39 is mounted on such shaft directly above such gripping roll, and a disk 93 is mounted on such shaft directly above such setter-roll, and these three members are keyed at 94 to said shaft. A washer 95 and a nut 96 are placed on each shaft 40 over the disk 93 thereon, and said nut tightly binds said disk and the setter-roll 39 and gripping roll 19 below between the shoulder 92 on said shaft and said washer. Mounted on each setter-roll 39, and centered by the disk 93 which rests on said setter-roll, is a hood 97. Mounted on each hood 97, and centered by a boss 98 thereon, is a ball-bearing consisting of two ball-race members 99 having balls 100 between, and an annular lock case 101. Each boss 98 enters one of the under ball-race members 99. A cross-bar 102 is provided and a pair of bolts 103 is attached by a pair of nuts 104 to said cross-bar. Each bolt 103 has a head 105 which bears on one of the upper ball-race members 99, and between which and a washer 108, on said bolt, is received that portion of the cross-bar 102 through which said bolt passes. A boss 106 on the underside of each bolt head 105 enters one of the upper members 99 and centers the parts. A slot 107 is provided in the cross-bar 102 for the bolt 103 which is over the shaft 40 that is adjusted by means of the screw 45, and the nut 104 on said bolt is left without being too firmly tightened, so as to permit the required adjustments to be made. A fork 109 is centrally mounted on the cross-bar 102 to receive the lever 87. The fork 109 has a screw-threaded stem 110 which passes through the cross-bar 102 and receives on its lower end a nut 111 by means of which said fork is held in place.

The weighted lever 87, acting through the fork 109, the cross-bar 102, the bolt heads 105, the ball-bearings, the hoods 97, the setter-rolls 39, and the gripping rolls 19, normally holds these parts and members together with the shafts 40 in their low positions; but said arm yields and swings upwardly on its pivot 88, whenever a force superior to the weight 89 elevates the aforesaid parts and members, including said shafts, overcoming said weight in so doing, as when a saw in the grasp of the gripping rolls 19 and subject to the action of the setter-rolls 39 presents a portion that is wider than the normal or minimum width for which the machine is adapted or to which it is set. As soon as the aforesaid wider portion of the saw passes the setter-rolls, the latter descend again, under the action of the weighted lever 87, with the other elements involved. The roller-bearings between the hoods 97 and the bolt heads 105 permit the shafts 40, with their attached parts, to revolve freely, while the cross-bar 102 and the members carried thereby and supported thereon remain stationary, except for the up and down movement produced on said cross-bar by the variance in the width of the saw or saws passed through the machine and acted on by the setter-rolls. The accommodating action of the setter-roll mechanism is instantaneous and local. In other words, said mechanism affords the necessary relief to and just the requisite clearance for the saws of varying width, and enables the setter-rolls to adapt themselves to any change in such width, whether such change be one of increase or decrease, without any lapse of time, and, what is of primary importance, at the exact place where relief for, proper clearance by, and adaptability or conformity to changed conditions on the part of the setter-rolls are needed and demanded. The setter-roll teeth must follow the saw teeth, when the latter are above their normal, minimum, or low level, as well as when they are on the same, said setter-roll teeth neither engaging said saw teeth at too high an elevation or at too low an elevation. The shafts 40 move up and down freely in their bearings, within the limits fixed and previously pointed out, hence the action of the setter-rolls in rising and falling is readily accomplished. The vertical movement of the shafts 40 is not sufficient to throw out any transmission member mounted on said shafts, or materially to interfere with or affect the transmission. In Fig. 7 the setter-rolls 39 are represented as having been elevated, with the other rising and falling parts and members, by reason of the presence beneath said setter-rolls of a saw 200.

The operation of the machine as a whole will be quite well understood from the foregoing description. It being assumed that necessary adjustments have been made, including the adjustment of the feed-roll 25 so that, while the teeth of said feed-roll are in engagement with the teeth of a saw, said feed-roll will present said saw to the setter-rolls 39 in such a way that the teeth of said setter-rolls will engage with exactitude said saw teeth, and that the machine has been started, the aforesaid operation briefly considered consists in placing one saw after another on the guide 4, at the front end of said guide, and pushing said saws into engagement with said feed-roll, when the latter actuates the saws sequentially into the grasp of the gripping rolls 19 and engagement with said setter-rolls, said gripping rolls actuate said saws sequentially along into the grasp of the conveyer rolls 21, and said last-named rolls actuate the saws in sequence onto the rear part of said guide. The setter-rolls set the saw teeth in the usual manner, bending certain teeth to one side, certain others to the other side, and leaving still others unbent. As has been clearly explained, the setter-rolls do this work accurately regardless of variations in the width of the saws, since said setter-rolls rise and fall with such variations, by riding up and down on the saw teeth which have an elevation that exceeds the normal or minimum elevation. The feed-roll, the pair of gripping rolls and the pair of conveyer rolls are so arranged relatively that each saw is well within the grasp of said gripping rolls before it passes clear of said feed-roll, and well within the grasp of said conveyer rolls before passing clear of said gripping rolls.

Naturally the shafts 40 and the parts carried thereon or thereby have a tendency to drop of their own weight, consequently the weight 89 need be only heavy enough to overcome any resistance that may be offered by the friction between said shafts and their bearings, and between certain of said parts, and to insure instant action and downward movement of said shafts and parts, when the high portions of the saws ride from beneath the setter-rolls.

As previously intimated in a general statement, there is a sufficient amount of play or freedom of independent movement between the worm 67 and the worm-gear 68 to enable the shaft 40, upon which said worm-gear is mounted, to rise and fall in the manner and to the extent required.

In the old style or type of machine, wherein the support for the saws, or the saw guide, yields, while the setter-rolls revolve in an unchanging horizontal plane, it is impossible to set all of the teeth of a saw uniformly, unless the saw be of the same width throughout, which is seldom the case. This is true of such a machine, first, because the feed-roll, which is remote from the setter-rolls, normally determines the amount of depression of the saw guide, and, if the latter be pressed down too far by a saw or part of a saw between it and said feed-roll, the teeth of the saw or part thereof that is between said guide and said setter-rolls do not fully enter between the latter and consequently are not set to the required depth; and, second, too much force may be required to press down the guide when a wider saw or a wider part of a saw passes beneath the setter-rolls, more force in fact than that required to press down the guide at the feed-roll end, and the saw teeth are consequently set too deep. In the new machine the setter-rolls are under just enough pressure to insure a good contact with the saw teeth regardless of the slight variation in the width of the saws. Another important advantage of my machine over the old machine is found in the construction which enables the setter-rolls independently and automatically to adjust themselves to the varying widths of the saws, so that both sides of the saws are always set alike. The setter-rolls in the old machine may not be and frequently are not adjusted accurately, or in such a manner that their teeth are in exact coöperative correspondence or agreement, with the result that the saw teeth set thereby are not set alike on both sides.

What I claim as my invention, and desire to secure by Letters Patent, is—

1. In a saw-setting machine, an unyielding saw guide, and yielding setter-rolls mounted adjacent to said guide, said guide being positioned and adapted to support the saw while being operated on by said setter-rolls.

2. In a saw-setting machine, an unyielding saw guide, and setter-rolls mounted adjacent to said guide, and arranged and adapted to ride up and down on saw teeth that are above the minimum elevation of such teeth, said guide being located below and adapted to support the saw while being operated on by said setter-rolls.

3. The combination, in a saw-setting machine, with an unyielding saw guide, of a pair of driven shafts journaled to move longitudinally, and setter-rolls mounted on said shafts adjacent to said guide, said guide being positioned and adapted to support the saw while being operated on by said setter-rolls.

4. The combination, in a saw-setting machine, with an unyielding saw guide, of a pair of driven shafts journaled to move longitudinally, yielding means to urge said shafts downwardly, and setter-rolls mounted on said shafts adjacent to said guide, said guide being located below and adapted to support the saw while being operated on by said setter-rolls.

5. The combination, in a saw-setting machine, with an unyielding saw guide, of a pair of driven shafts journaled to move longitudinally, one of said shafts being adjustable toward and away from the other, and setter-rolls mounted on said shafts adjacent to said guide, said guide being positioned and adapted to support the saw while being operated on by said setter-rolls.

6. The combination, in a saw-setting machine, with an unyielding saw guide, a pair of driven shafts journaled to move longitudinally, and setter-rolls mounted on said shafts adjacent to said guide, of a lever arranged and adapted to bear forcibly on said shafts.

7. The combination, in a saw-setting machine, with an unyielding saw guide, a pair of driven shafts journaled to move longitudinally, and setter-rolls mounted on said shafts adjacent to said guide, of a downwardly-pressed lever, and means to transmit the pressure from said lever through said supporting member to said shafts.

8. The combination, in a saw-setting machine, with an unyielding saw guide, and a downwardly-pressed lever, of a pair of driven shafts journaled to move longitudinally, setter-rolls mounted on said shafts adjacent to said guide, and means to support said lever on said setter-rolls, said guide being located below and adapted to support the saw while being operated on by said setter-rolls.

9. The combination, in a saw-setting machine, with an unyielding saw guide, and a downwardly-pressed lever, of a pair of driven shafts journaled to move longitudinally, setter-rolls mounted on said shafts adjacent to said guide, ball-bearing supporting members arranged above said setter-rolls, a supporting member for said lever, said lever-supporting member being provided with ball-bearing supported members, and ball-bearings between said ball-bearing supporting and supported members, said guide being located below and adapted to support the saw while being operated on by said setter-rolls.

10. The combination, in a saw-setting machine, with an unyielding saw guide, and a downwardly-pressed lever, of a pair of driven shafts journaled to move longitudinally, one of said shafts being adjustable toward and away from the other, setter-rolls mounted on said shafts adjacent to said guide, ball-bearing supporting members arranged above said setter-rolls, a supporting member for said lever, ball-bearing supported members connected with said lever-supporting members, said ball-bearing supported members which are over the laterally adjustable shaft being adjustable to accommodate the same to the lateral adjustment of said last-named shaft, and ball-bearings between said ball-bearing supporting and supported members, said guide being located below and adapted to support the saw while being operated on by said setter-rolls.

11. The combination, in a saw-setting machine, with an unyielding saw guide, and non-rotary yielding pressure-applying means, of a pair of driven shafts journaled to move longitudinally, and subject to said means, setter-rolls mounted on said shafts adjacent to said guide, and anti-friction bearing members between the rotary parts and said pressure-applying means, said guide being positioned and adapted to support the saw while being operated on by said setter-rolls.

12. In a saw-setting machine, setter-rolls, a feed-roll, driving members for said feed-roll, and means to operate one of said driving members whereby the other is operated to adjust said feed-roll so that it shall be in agreement with said setter-rolls.

13. The combination, in a saw-setting machine, with the setter-rolls of the machine, of a shaft having a feed-roll and a transmission member mounted thereon, an adjustable member, and a driven shaft journaled in said adjustable member, and carrying a transmission member in engagement with said first-named transmission member, whereby said feed-roll may be adjusted to agree with said setter-rolls.

14. The combination, in a saw-setting machine, with the setter-rolls of the machine, of a shaft having a feed-roll and a transmission member mounted thereon, a sliding member, a screw arranged to operate said sliding member, and a driven shaft journaled in said sliding member, and carrying a transmission member in engagement with said first-named transmission member, whereby said feed-roll may be adjusted to agree with said setter-rolls.

15. The combination, in a saw-setting machine, with a support, a shaft journaled in said support, and a feed-roll and a spiral gear mounted on said shaft, of a sliding member in said support, a screw arranged to operate said sliding member, a driven shaft journaled in said sliding member, and a spiral gear mounted on said last-named shaft, and intermeshing with said first-named spiral gear, the construction and arrangement of parts being such that, when said screw is turned to operate said sliding member, said feed-roll is adjusted upon its axis, through the medium of said spiral gears and the parts intervening between them and said sliding member and feed-roll.

CARL L. ERICSON.

Witnesses:
F. A. CUTTER,
A. C. FAIRBANKS.